US012266869B2

(12) United States Patent
Prakash et al.

(10) Patent No.: US 12,266,869 B2
(45) Date of Patent: Apr. 1, 2025

(54) CO-LOCATED ANTENNAS (71) Applicant: Halliburton Energy Services, Inc., Houston, TX (US)

(72) Inventors: Anand Prakash, Tomball, TX (US); Matthew Chase Griffing, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1303 days.

(21) Appl. No.: 16/960,268

(22) PCT Filed: Mar. 5, 2018

(86) PCT No.: PCT/US2018/020965
§ 371 (c)(1),
(2) Date: Jul. 6, 2020

(87) PCT Pub. No.: WO2019/172880
PCT Pub. Date: Sep. 12, 2019

(65) Prior Publication Data
US 2021/0075110 A1 Mar. 11, 2021

(51) Int. Cl.
*H01Q 7/08* (2006.01)
*G01V 1/52* (2006.01)
(Continued)

(52) U.S. Cl.
CPC ............... *H01Q 7/08* (2013.01); *G01V 1/52* (2013.01); *G01V 3/28* (2013.01); *H01Q 1/085* (2013.01); *E21B 47/12* (2013.01)

(58) Field of Classification Search
CPC ............ H01Q 7/08; H01Q 1/085; H01Q 1/04; H01Q 21/06; G01V 1/52; G01V 3/28; E21B 47/12
See application file for complete search history.

(56) References Cited

U.S. PATENT DOCUMENTS 6,788,065 B1 9/2004 Homan et al.
2008/0036672 A1 2/2008 Ueda et al.
(Continued)

FOREIGN PATENT DOCUMENTS

JP 2012070164 4/2012
WO 2020055417 3/2020

OTHER PUBLICATIONS

SRWO International Search Report and Written Opinion for PCT/US2018/020965 dated Dec. 5, 2018.
(Continued)

*Primary Examiner* — Hyun D Park
(74) *Attorney, Agent, or Firm* — Benjamin Ford; C. Turney Law Group PLLC (57) ABSTRACT

An antenna assembly includes a tool mandrel having a tool axis; a first coil antenna including a first plurality of windings wrapped about the tool mandrel, wherein the first coil antenna is arranged in a first orientation and wherein portions of the first plurality of windings are wrapped about the tool mandrel at a first winding angle defined with respect to the tool axis; and a second coil antenna co-located with the first coil antenna and including a second plurality of windings wrapped about the tool mandrel, wherein the second coil antenna is arranged in a second orientation opposite the first orientation, wherein portions of the second plurality of windings are wrapped about the tool mandrel at a second winding angle defined with respect to the tool axis and wherein a difference between a loop area of the first coil antenna and a loop area of the second coil antenna is less than 25%.

28 Claims, 8 Drawing Sheets

(51) Int. Cl.
*G01V 3/28* (2006.01)
*H01Q 1/08* (2006.01)
*E21B 47/12* (2012.01)

(56) References Cited

U.S. PATENT DOCUMENTS

| | | | |
|---|---|---|---|
| 2009/0179647 A1* | 7/2009 | Wang | G01V 3/28 324/339 |
| 2014/0032116 A1* | 1/2014 | Guner | G01V 3/28 702/6 |
| 2016/0248143 A1 | 8/2016 | Hensarling et al. | |
| 2017/0184753 A1* | 6/2017 | Prakash | E21B 49/00 |
| 2019/0331824 A1* | 10/2019 | Bittar | H01Q 1/526 |

OTHER PUBLICATIONS

Norwegian Office Action for Application No. 20200853 dated Jan. 28, 2021.

\* cited by examiner

CO-LOCATED ANTENNAS

FIELD

This disclosure relates, in general, to equipment utilized in conjunction with operations performed in relation to subterranean wells and, in particular, to a flexible antenna assembly operable for use in a subterranean well logging system.

BACKGROUND

During drilling operations for the extraction of hydrocarbons, a variety of recording and transmission techniques are used to provide or record real-time data from the vicinity of a drill bit. Measurements of surrounding subterranean formations may be made throughout drilling operations using downhole measurement and logging tools, such as measurement-while-drilling (MWD) tools, which aid in making operational decisions, and logging-while-drilling (LWD) tools, which help characterize the formations. LWD tools in particular obtain measurements used to determine the electrical resistivity (or its inverse, conductivity) of the surrounding subterranean formations being penetrated, where the electrical resistivity indicates various geological features of the formations. These resistivity measurements may be taken using one or more antennas coupled to or otherwise associated with the wellbore logging tools.

Logging tool antennae are often formed by positioning coil windings about an axial section of the wellbore logging tool, such as a drill collar. A soft magnetic material is sometimes positioned beneath the coil windings to increase the efficiency and/or sensitivity of the logging tool antennae. The soft magnetic material facilitates a higher magnetic permeability path (i.e., a flux conduit) for the magnetic field generated by the coil windings, and helps shield the coil windings from adjacent drill collars and associated losses (e.g., eddy currents generated on the drill collars).

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates generally to wellbore logging tools used in the oil and gas industry and, more particularly, to the design of tilted coil antennas using stacked soft magnetic inserts and innovative antenna shields that improve gain, sensitivity, and efficiency of the tilted coil antennas.

Embodiments disclosed are directed to antenna assemblies used in resistivity logging tools for monitoring surrounding subterranean formations adjacent a drilled wellbore. The antenna assemblies described herein may include two coil antennas wound about the resistivity logging tool with one antenna at least partially overlapping the other antenna. This overlapping arrangement of the coil antennas may be referred to as "co-located" coil antennas. In contrast, prior art tools include antennas that do not overlap each other and are located axially separated from each other. As discussed further below, each coil antenna may be "tilted" or otherwise disposed at an angle greater than 0° and less than 90° relative to the tool axis and the two antennas may be oriented in an opposite directions.

Each coil antenna may be formed by a plurality of elliptical turns of a coil. For the two coil antennas to be matched, the coil antennas may have a same number of turns, a same loop area (when wound on the core (e.g., FIGS. 4A, 5 and 7)), and a same winding angle. When matched, the two coil antennas may have substantially similar sensitivities and the impedances. However, due to manufacturing constraints and mechanical strength of the coils, the loop areas of the coil antennas may not be the same. As disclosed below, matched coil antennas may be obtained by having the loop areas of the coil antennas within a predetermined tolerance of each other. Stated otherwise, a difference between the loop areas of the two coil antennas is within a predetermined threshold. In an example, the two coil antennas may be considered as matched coil antennas when a difference in their loop areas is within about 10%. In another example, the two coil antennas may be considered as matched coil antennas when a difference in their loop areas is within about 20%. In yet another example, the two coil antennas may be considered as matched coil antennas when a difference in their loop areas is within about 25%. As used herein, the loop area of a coil antenna may refer to the area enclosed by the elliptical coil antenna.

Existing resistivity logging tools include coil antennas at different axial locations on the tool. As a result, the axial extent (e.g., length) of the resistivity logging tool increases to accommodate the coil antennas. By co-locating the two antennas, an axial extent of the resistivity logging tool may be decreased, resulting in a more compact design and reduced costs. Although embodiments are discussed with reference to two coil antennas, embodiments disclosed are also applicable to antenna assembles including more than two overlapping coil antennas.

Figure 1:
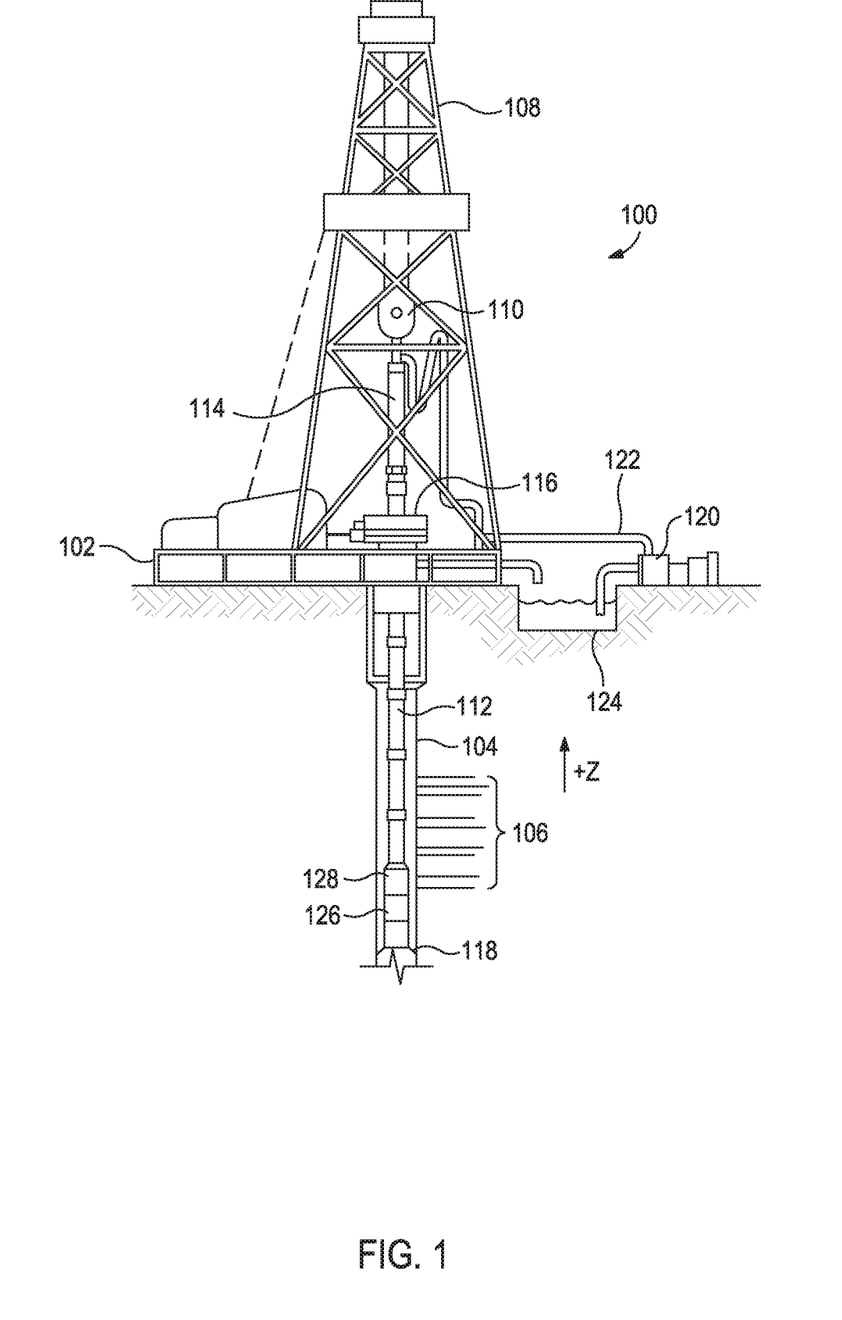
FIG. 1 is a schematic diagram of an example drilling system that may employ the principles of the present disclosure.

FIG. 1 is a schematic diagram of an example drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one resistivity logging tool 126, which may comprise two co-located coil antennas capable of transmitting and/or receiving one or more electromagnetic (EM) signals to and from the subterranean formations 106.

As the drill bit 118 extends the wellbore 104 through the formations 106, the resistivity logging tool 126 may continuously or intermittently collect azimuthally-sensitive measurements relating to the resistivity of the formations 106, i.e., how strongly the formations 106 opposes a flow of electric current. The resistivity logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the resistivity logging tool 126 may also be stored within the resistivity logging tool 126 or the telemetry module 128 for later retrieval at the surface upon retracting the drill string 112.

Figure 2:
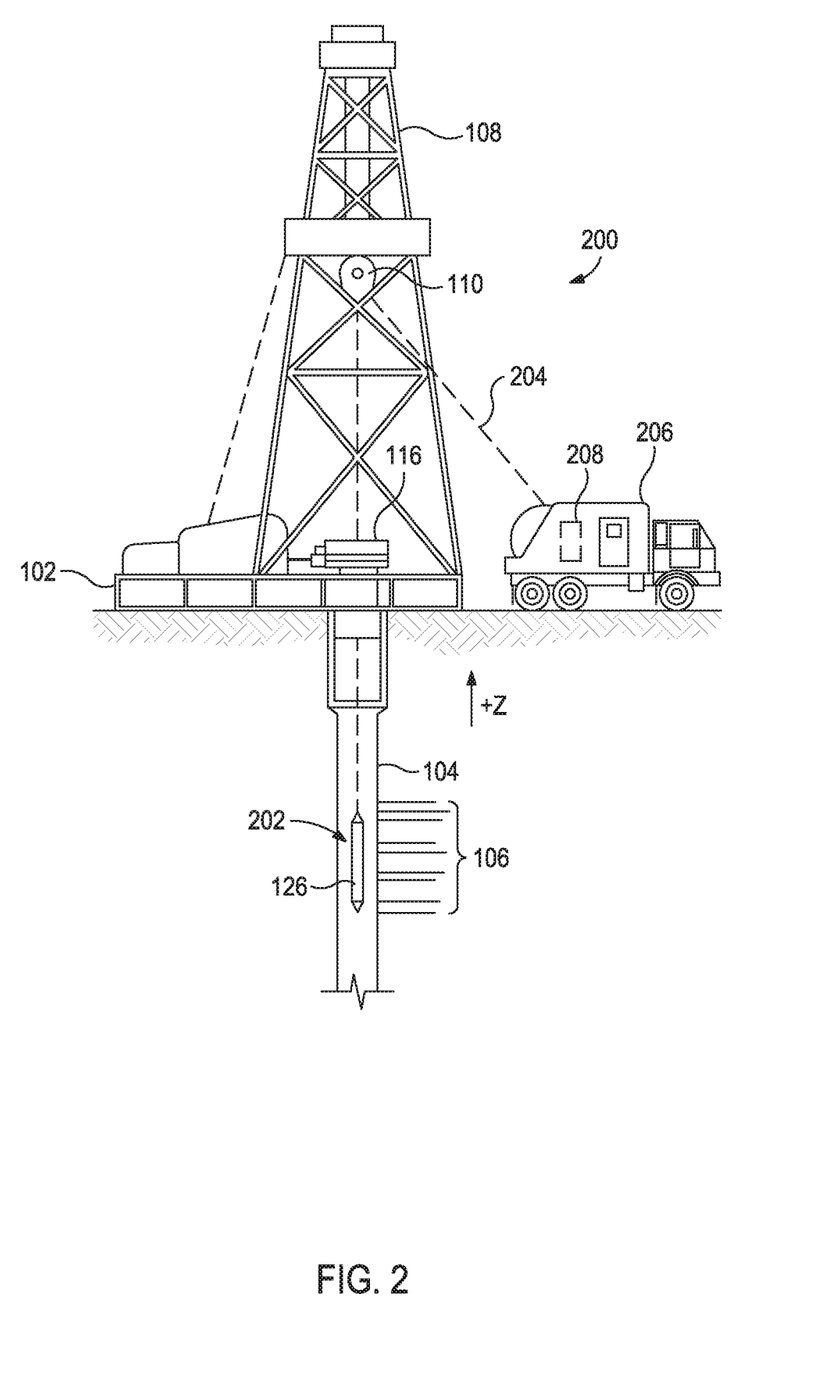
FIG. 2 is a schematic diagram of an example wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an example wireline system 200 that may employ the principles of the present disclosure, according to one or more embodiments. Like numerals used in FIGS. 1 and 2 refer to the same components or elements and, therefore, may not be described again in detail. As illustrated, the wireline system 200 may include a wireline instrument sonde 202 that may be suspended in the wellbore 104 on a cable 204. The sonde 202 may include the resistivity logging tool 126 described above, which may be communicably coupled to the cable 204. The cable 204 may include conductors for transporting power to the sonde 202 and also facilitate communication between the surface and the sonde 202. A logging facility 206, shown in FIG. 2 as a truck, may collect measurements from the resistivity logging tool 126, and may include computing and data acquisition systems 208 for controlling, processing, storing, and/or visualizing the measurements gathered by the resistivity logging tool 126. The computing and data acquisition systems 208 may be communicably coupled to the resistivity logging tool 126 by way of the cable 204.

Even though FIGS. 1 and 2 depict the systems 100 and 200 including vertical wellbores, it should be understood by those skilled in the art that principles of the present disclosure are equally well suited for use in wellbores having other orientations including horizontal wellbores, deviated wellbores, slanted wellbores or the like. Accordingly, it should be understood by those skilled in the art that the use of directional terms such as above, below, upper, lower, upward, downward, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well, the downhole direction being toward the toe of the well. Also, even though FIGS. 1 and 2 depict an onshore operation, it should be understood by those skilled in the art that principles of the present disclosure are equally well suited for use in offshore operations, wherein a volume of water may separate the drilling platform 102 and the wellbore 104.

Figure 3:
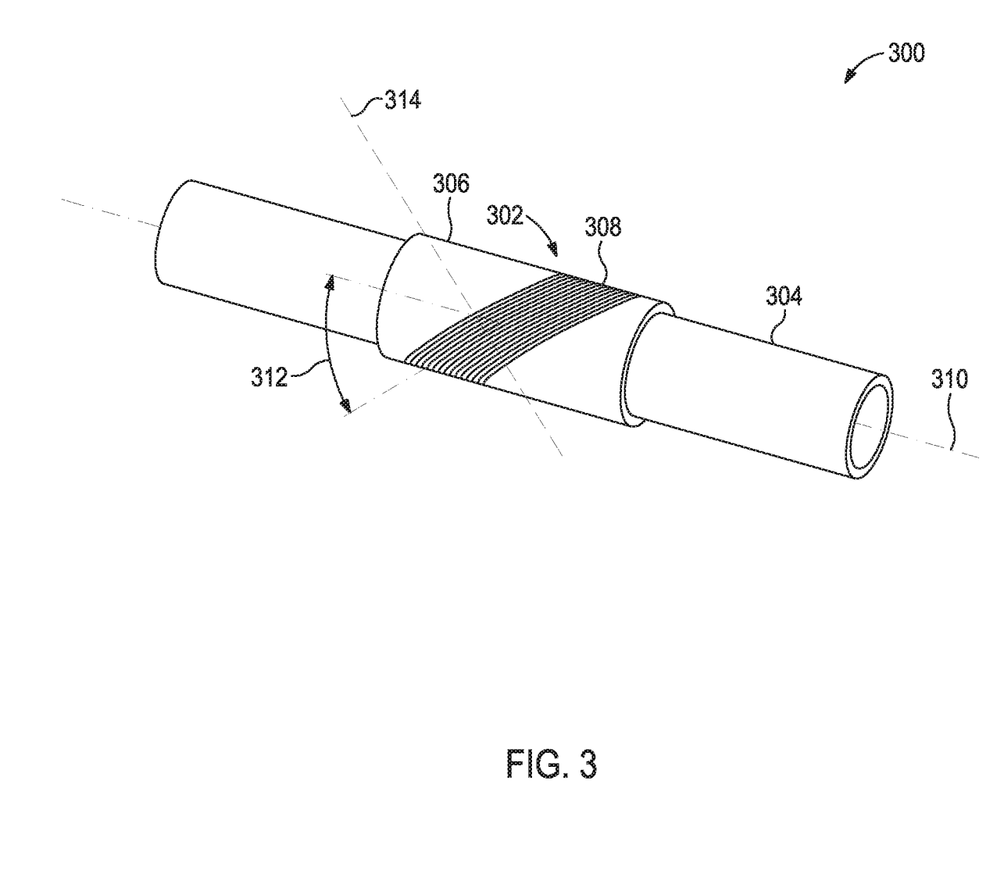
FIG. 3 is a partial isometric view of an existing wellbore logging tool.

FIG. 3 is a partial isometric view of a conventional wellbore logging tool 300 used in the drilling or wireline systems 100, 200 depicted therein. The wellbore logging tool 300 is depicted as including an antenna assembly 302 that can be positioned about a tool mandrel 304, such as a drill collar or the like. The antenna assembly 302 may include a core 306 disposed on the tool mandrel 304 and a coil antenna 308 wrapped about the core 306 and extending axially by virtue of winding along at least a portion of an outer surface of the core layer 306.

The core 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The core 306 can be fabricated, for example, by additive manufacturing (i.e., 3D printing), molding, injection molding, machining, or other known manufacturing processes. The core 306 may be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE) and polysulphone (PSU). Preferably, the material of the core 306 has suitable deformability, moldability, bendability and/or flexibility such that the antenna assembly 302 may be elastically or pliably deformed, molded, bended or flexed to aid in the process of installing the antenna assembly 302 exteriorly on or around the wellbore logging tool 300 by, for example, sliding the antenna assembly 302 over at least a portion of the length of wellbore logging tool 300 including potentially radially expanded portions thereof.

The coil antenna 308 can include any number of consecutive elliptical "turns" (i.e. windings of the coil antenna 308) about the core 306, but typically will include at least a plurality (i.e. two or more) consecutive full turns, with each full turn extending 360° about the core 306. In some embodiments, a pathway for receiving the coil antenna 308 may be formed along the outer surface of the core 306. For example, one or more grooves or channels may be defined in the outer surface of the core 306 to receive and seat the coil antenna 308. In other embodiments, however, the outer surface of the core 306 may be smooth or even. The coil antenna 308 can be concentric or eccentric relative to a tool axis 310 of the tool mandrel 304.

As illustrated, a portion of the turns or windings of the coil antenna 308 extend about the core 306 at a winding angle 312 defined with respect to the tool axis 310 and the coil antenna 308 may define a loop axis 314 is orthogonal to the winding angle 312. More specifically, the windings of the coil antenna 308 on opposing sides of the core 306 extend about the outer circumference of the core 306 at the winding angle 312. The windings, however, transition to perpendicular to the tool axis 310 at the top and bottom of the core 306, at which point the windings transition back to the winding angle 312 on opposing sides of the core 306. Successive windings of the coil antenna 308 (i.e., one or more successive revolutions of the coil antenna 308) advance in a generally axial direction along at least a portion of the outer surface of the core 306 such that coil antenna 308 spans an axial length of the core 306. The antenna assembly 302 may be characterized and otherwise referred to as a "tilted coil antenna" or "directional" antenna. In the illustrated embodiment, the winding angle 312 is 45°, by way of example, and could alternatively be any angle greater than 0° and less than 90° relative to the tool axis 310, without departing from the scope of the disclosure.

Although not illustrated, the coil antenna 308 includes at least two leads that are connected to electrical circuitry (not illustrated). The electrical circuitry is of the type known to those skilled in the art that is operable to provide or supply electric current to coil antenna 308 such that the coil antenna 308 generates electromagnetic signals and/or receive electric current from the coil antenna 308 when the coil antenna 308 receives electromagnetic signals. The electrical circuitry may be contained in the wellbore logging tool 300, for example, in a hermetically sealed cavity. Alternatively or additionally, the electrical circuitry may be located in another tool that is positioned proximate to wellbore logging tool 300 in the tool string. Regardless of location, the electrical circuitry may, for example, process received signals to measure amplitude and phase, or alternatively, may digitize and timestamp signals and communicate signals to other components of the logging tool or logging system. In operation, when an alternating current is applied to the coil antenna 308 by the electrical circuitry, an electromagnetic field is produced. Conversely, an alternating electromagnetic field in the vicinity of the coil antenna 308 induces a voltage at the leads causing an alternating current to flow from coil antenna 308 to the electrical circuitry. Thus, the antenna assembly 302 may be used to transmit or receive electromagnetic waves.

Figure 4A:
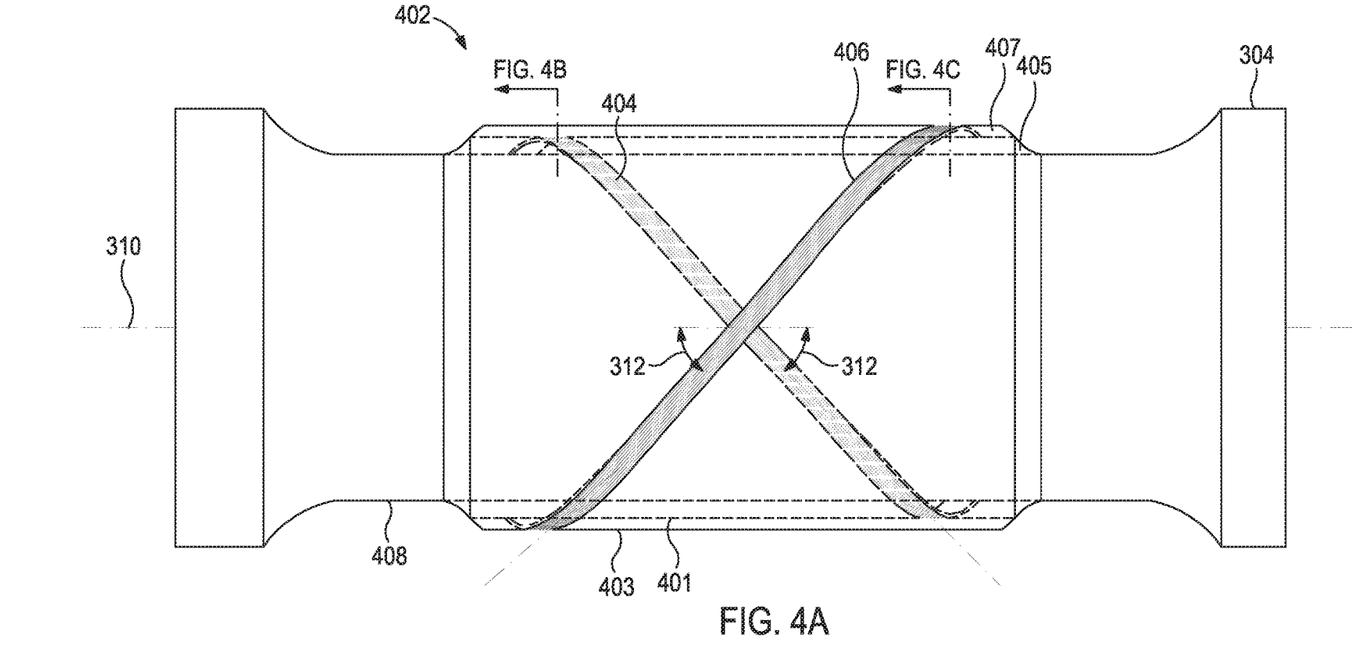
FIG. 4A illustrates a side view of an example antenna assembly, according to one or more embodiments disclosed.
Figure 4B:
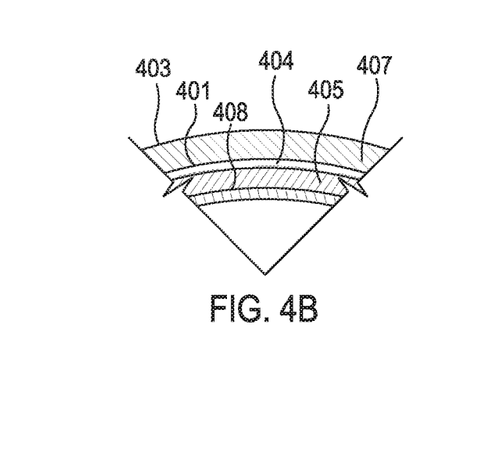
FIGS. 4B and 4C illustrate cut-away views of a portion of the tool mandrel of the antenna assembly in FIG. 4A.
Figure 4C:
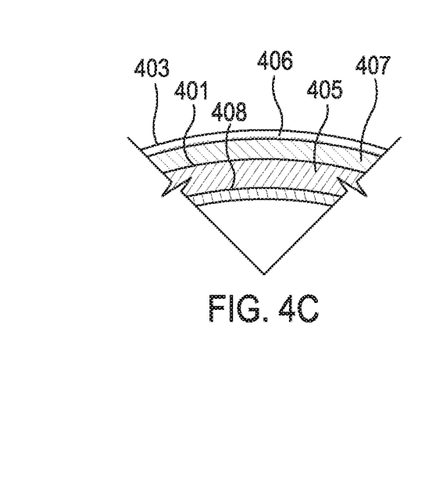

FIG. 4A illustrates a side view of an example antenna assembly 402, according to one or more embodiments disclosed. FIGS. 4B and 4C illustrate cut-away views of a portion of the tool mandrel 304 of the antenna assembly 402. The antenna assembly 402 may be may be similar in some respects to the antenna assembly 302 of FIG. 3 and, therefore, may be best understood with reference thereto, where like numerals represent like element not described again. As illustrated, the antenna assembly 402 includes two co-located coil antennas 404 and 406 each wound about respective cores 405 and 407 extending about the outer circumference of the tool mandrel 304 and at the same position on the tool mandrel 304. The coil antennas 404 and 406 may be arranged or otherwise seated in grooves or channels defined in the outer surfaces 401 and 403, respectively, of the corresponding cores 405 and 407. However, in other embodiments, the outer surfaces 401 and 403 of one or more of the cores 405 and 407 may be smooth or even. In an example, and as illustrated, the coil antennas 404 and 406 may be concentric relative to the tool axis 310 of the tool mandrel 304. However, in other examples, the coil antennas 404 and 406 may be eccentric, without departing from the scope of the disclosure. The coil antennas 404 and 406 may be separated from each other (for example, by a distance about the thickness of the core 407), and thereby crosstalk between the coil antennas 404 and 406 at the location where the coil antennas 404 and 406 intersect each other is minimized. For the purposes of discussion herein, it will be understood that, when the coil antennas, e.g., coil antennas 404 and 406, are referred to as intersecting each other, the coil antennas do not directly contact each other.

The cores 405 and 407 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The cores 405 and 407 may be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluoroethylene (PTFE) and polysulphone (PSU).

As illustrated, the core 405 may be placed inside the core 407 on the tool mandrel 304 such that the coil antennas 404 and 406 overlap each other. For instance, referring to FIGS. 4A-4C, the core 405 may be initially disposed on the outer surface of the mandrel 304 and the coil antenna 404 may be arranged on the outer surface 401 of core 405. The core 407 may then be disposed on the core 405 and the coil antenna 404, and the coil antenna 406 may be arranged on the outer surface 403 of the core 407. In an example, the cores 405 and 407 may have the same thickness (radial extent). In another example, the cores 405 and 407 may have different thicknesses. The cores 405 and 407, and thereby the coil antennas 404 and 406, may be arranged within a saddle 408 defined on the tool mandrel 304. The saddle 408 may comprise a portion of the tool mandrel 304 that exhibits a reduced-diameter as compared to the remaining portions of the tool mandrel 304. As illustrated, the coil antennas 404 and 406 may both have a same winding angle 312 of about 45° and may be tilted in opposite directions of each other. Stated otherwise, the coil antennas 404 and 406 may have opposite orientations, wherein the coil antennas 404 and 406 may be rotated 180° relative to one another. In operation, each of coil antennas 404 and 406 is operable to transmit or receive electromagnetic energy. Each of the coil antennas 404 and 406 includes at least two leads (not visible) that may be connected to electrical circuitry of a well logging tool, as discussed above.

A sleeve or other protective cover (not illustrated) formed of conductive material, non-conductive material or a combination thereof, such as a non-magnetic steel, may be positioned over the antenna assembly 402. The sleeve may be solid or may have perforations therethrough that may generally correspond with the position of coil antennas 404 and 406 thereunder.

As will be understood from the discussion above, the antenna assembly 402 may reduce the axial length of the wellbore logging tool since the coil antennas 404 and 406 are co-located. Existing tools include coil antennas axially separated from each other, and this increases the length of the tool. By co-locating the coil antennas 404 and 406, a more compact design is obtained and manufacturing and operating costs are reduced.

Referring briefly to antenna assembly 302 in FIG. 3, the sensitivity of the coil antenna 308 in the loop axis 314 can be obtained using Equation 1 below:

$$\frac{V}{B} = 2\pi f N A \quad \text{Equation 1}$$

wherein, $$\frac{V}{B}$$

represents the output voltage per unit magnetic flux density (Volts/Tesla),

V represents output voltage in volts,

B represents magnetic flux density in Tesla and B=µH, wherein

H represents the magnetic field in Ampere/meter, and

µ represents the effective permeability and µ=µ$_r$µ$_0$, where µ$_0$ is the permeability of free space ($4\pi \times 10^{-7}$ H/m) and is the permeability relative to µ$_0$, f represents the frequency in Hertz, N represents the number of turns, A represents the loop area of the coil antenna in square meters, and NA=loop effective aperture (Ae).

As understood from the discussion above, the sensitivity is directly proportional to the loop area A and the number of turns (N). Referring to FIGS. 4A-4C, because the two coil antennas 404 and 406 are matched, the number of turns is the same for each of the two coil antennas 404 and 406 and each coil antenna 404 and 406 may have the same winding angle 312. Thus, the loop area A may be the only variable to consider. Although, due to manufacturing constraints and mechanical strength of the coils, the co-located coil antennas 404 and 406 may not have exactly the same loop area A, it is desirable to keep the loop areas as matched (in close proximity) as possible. The inductance L of the coil antennas 404 and 406 is correlated to the loop area, and thus keeping the loop areas of the two coil antennas 404 and 406 substantially matched (or similar) will result in similar impedances Z (=2πfL).

In an embodiment, the antenna loop areas may be maintained within 10% of each other. From the calculation below, it will be understood that this will result in antenna sensitivities matched within about 1 dB of each other. The area A of the tilted loops can be calculated using the ellipse equation A=πab, wherein a represents the dimension of the major axis and b represents the dimension of the minor axis. Considering a winding angle 312 of 45°, then $a=\sqrt{2}b^2$, and therefore any reduction in the b dimension will result in a proportional reduction in the a dimension. Based on the calculations below, it can then be seen that a 5% reduction in the b dimension will result is about a 10% reduction in the loop area of the antenna.

$A=\pi(0.95)^2=2.835$, which when normalized to π results in $$\frac{2.835}{\pi} = 0.9025 = 90.25\%$$

20 log(0.9025) = −0.891 dB (which is within 1 dB)

Therefore, it may be understood that to maintain a match of within 10% (~1 dB) between the loop areas of coil antennas 404 and 406, the b dimension of the coil antennas 404 and 406 must be kept within about 5% of each other.

It may be possible to increase the difference between the loop areas of the two coil antennas 404 and 406 and yet obtain matching between the two coil antennas 404 and 406. However, it may be beneficial to maintain the loop area difference less than about 25%. A loop area difference of around 24% may allow for about 14% reduction in the b dimension, as shown below.

$A=\pi(0.86)^2=2.3235$, which when normalized to π results in $$\frac{2.3235}{\pi} = 0.7396 \text{ (or 73.96\%)}$$

20 log(0.7396) = −2.62 dB (which is within 3 dB)

An increase in the loop area difference greater than about 25% will result in a sensitivity difference of 3 dB or more between the coil antennas 404 and 406. The coil antennas 404 and 406 may not be matched at this sensitivity difference and may require adjustment in number of turns of the coils, adjustment to the antenna gain (e.g., of the receiver coil antenna), and/or an adjustment to the excitation signal amplitude (e.g., of the transmitter coil antenna) to compensate for the difference in sensitivity. This could complicate or prevent the use of common electronics/hardware, thereby increasing system complexity and costs. Further, a sensitivity difference of 3 dB or more may require significant additional corrections/calibration to the raw data or changes to data processing algorithms to account for the difference that could result in more residual error in the final formation measurement. There are also practical mechanical considerations as well, the better the loop area match, the closer (e.g., radially) the coil antennas are to each other, allowing a minimum amount of core material to be removed, which will maximize the core strength.

Figure 5:
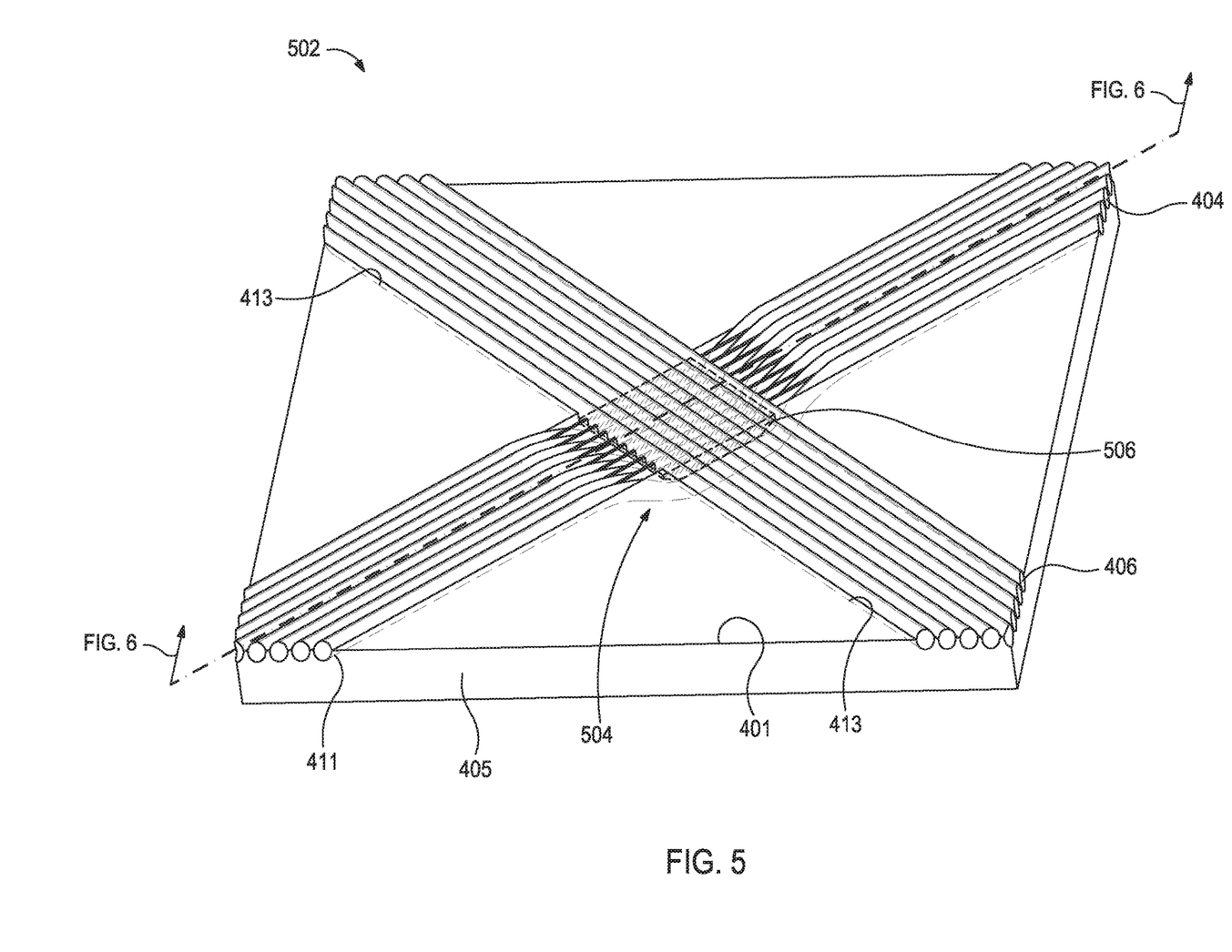
FIG. 5 illustrates an isometric view of the portion of an antenna assembly where the coil antennas of the antenna assembly intersect each other, according to embodiments disclosed.

FIG. 5 illustrates an isometric view of the portion of an antenna assembly 502 where the coil antennas 404 and 406 of the antenna assembly 502 intersect each other, according to one or more embodiments disclosed. The antenna assembly 502 may be similar in some respects to the antenna assembly 402 of FIG. 4A and, therefore, may be best understood with reference thereto, where like numerals represent like element not described again. As described above, the coil antennas 404 and 406 in FIG. 4A may be located on respective cores 405 and 407 arranged on the tool mandrel 304. The coil antennas 404 and 406 may thus be located on different diameters (or, alternatively, at different radial distances measured from the tool axis 310). As discussed further below, the coil antennas 404 and 406 of the antenna assembly 502 may be both arranged on substantially the same diameter. For the sake of illustration and explanation, FIG. 5 illustrates the core 405, and the coil antennas 404 and 406 as being planar. However, referring to FIG. 4A, it will be understood that the core 405 and the coil antennas 404 and 406 are curved.

As illustrated, the core 407 may be omitted from the antenna assembly 502 and the coil antennas 404 and 406 may be arranged on the same core 405, except for the location where the coil antennas 404 and 406 intersect. The outer surface 401 of the core 405 may include a depression 504 (or any other generally concave portion) at the location where the coil antennas 404 and 406 intersect each other.

The coil antenna 404 may be arranged in the depression 504, while the coil antenna 406 may be arranged above the coil antenna 404 and separated therefrom. Thus, the coil antennas 404 and 406 are substantially on the same diameter, except for the location where the coil antennas 406 and 406 intersect. As illustrated in FIG. 5, grooves or channels 411 may be defined in the outer surface 401 and in the depression 504 of the core 405 to receive and seat the coil antenna 404. Similarly, grooves or channels 413 may be defined in the outer surface 401 of the core 405 to receive and seat the coil antenna 406. However, in other embodiments, the outer surface 401 of the core 405 may be smooth or even, and the coil antennas 404 and 406 may be arranged on the outer surface 401.

Figure 6:
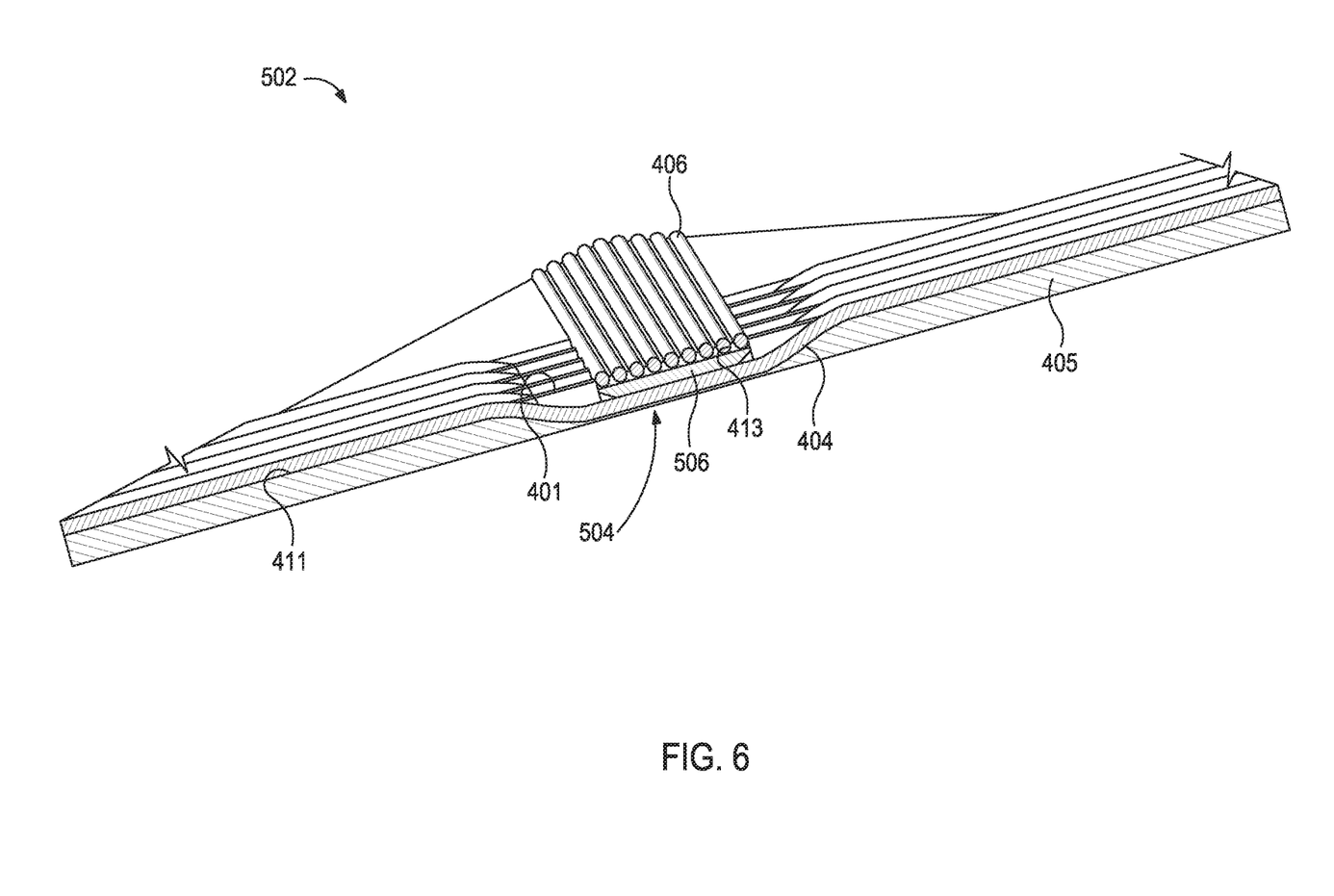
FIG. 6 is a cross-sectional isometric view of the antenna assembly in FIG. 5.

FIG. 6 is a cross-sectional isometric view of the antenna assembly 502 in FIG. 5. In an example and as illustrated, the depression 504 may have a generally trough shape with sidewalls that ramp from the outer surface 401 to the bottom of the depression 504; however, the depression 504 may also have other shapes, without departing from the scope of the disclosure. An interposer 506 may be disposed in the depression 504 to separate the coil antennas 404 and 406. In an example, the interposer 506 may be made of fiberglass that is shaped and sized (or otherwise configured) to substantially fill the depression 504. However, it will be understood that the interposer 506 may not be limited to fiberglass and may be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE), polysulphone (PSU), or any other material that may substantially fill the depression 504 and is resistant to the downhole conditions (e.g., pressure, temperature, vibrations, and the like) experienced by the wellbore logging tool during operation (e.g., drilling operations, wireline operations, etc.). Specifically, the interposer 506 should limit contact between the coil antennas 404 and 406 when subjected to the downhole conditions. The interposer 506 also may not interfere with the one or more electromagnetic (EM) signals that are transmitted and/or received by the coil antennas 404 and 406. The loop area difference of the coil antennas 404 and 406 may be less than about 25%. Thus, the thickness (e.g., radial extent) of the interposer 506 may be such that the loop area difference is maintained below about 25%.

Figure 7:
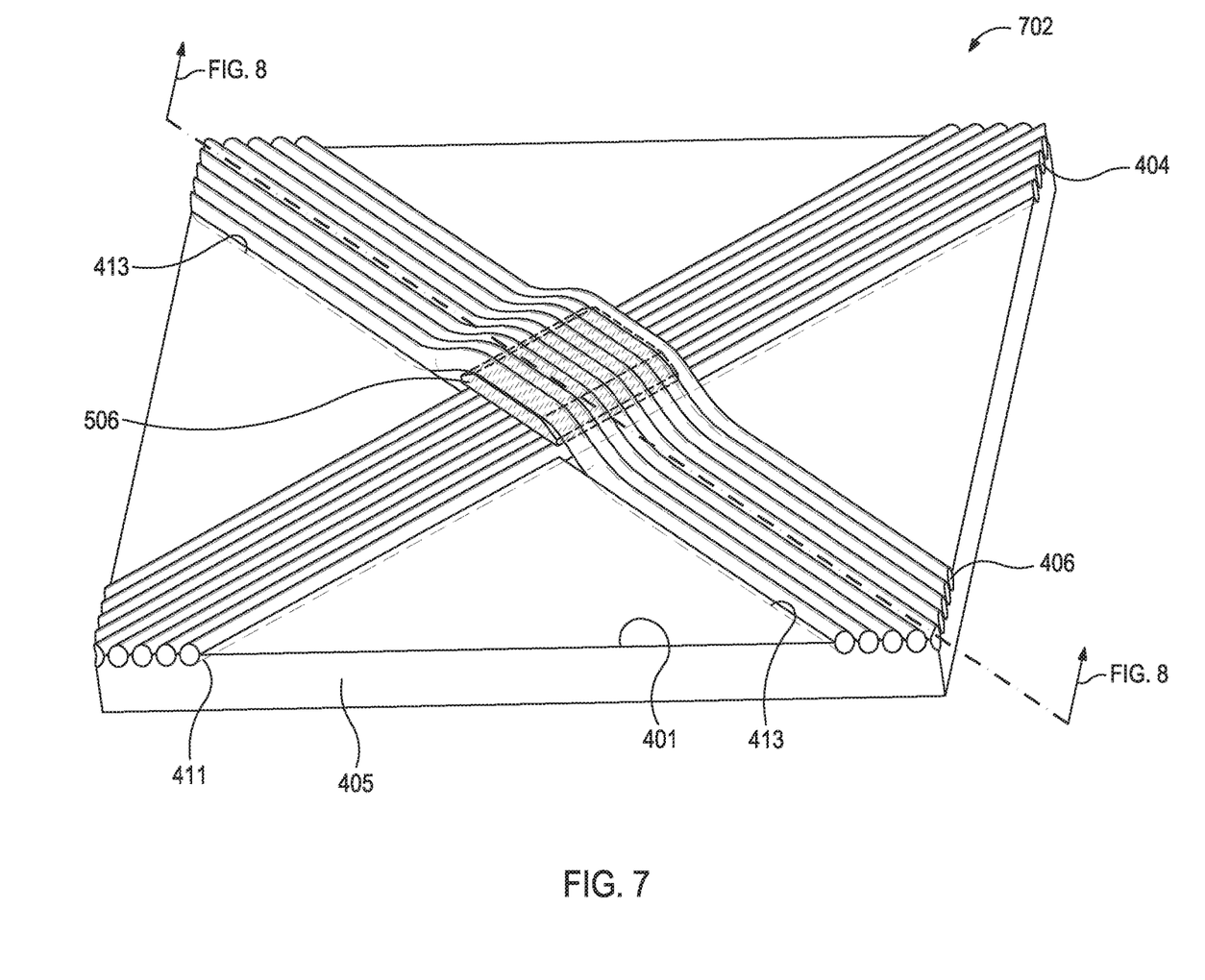
FIG. 7 illustrates an isometric view of the portion of another antenna assembly where the coil antennas of the antenna assembly intersect each other, according to one or more embodiments disclosed.
Figure 8:
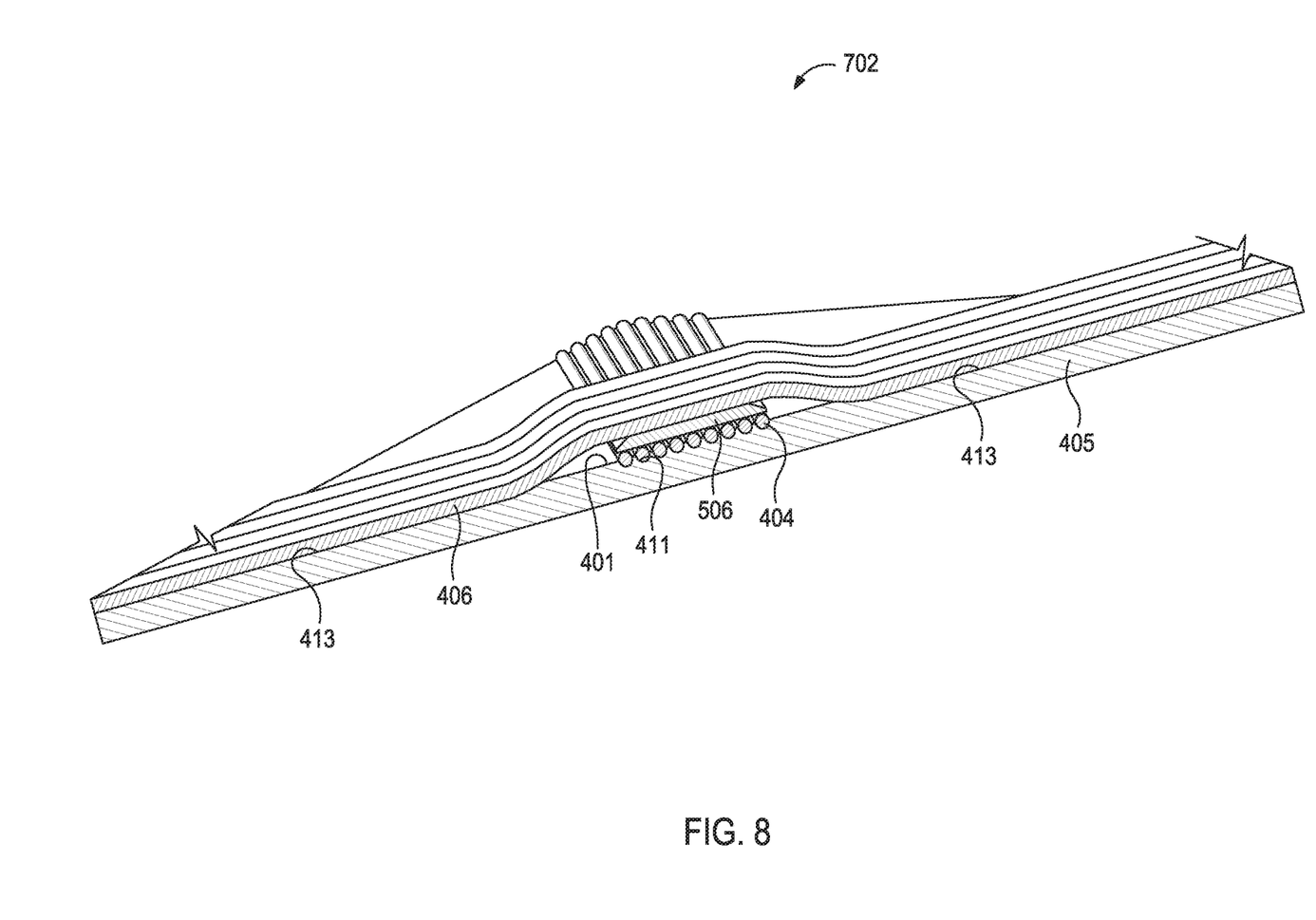
FIG. 8 is a cross-sectional isometric view of the antenna assembly in FIG. 7.

FIG. 7 illustrates an isometric view of the portion of an antenna assembly 702 where the coil antennas 404 and 406 of the antenna assembly 702 intersect each other, according to one or more embodiments disclosed. FIG. 8 is a cross-sectional isometric view of the antenna assembly 702 in FIG. 7. The antenna assembly 702 may be similar in some respects to the antenna assembly 502 of FIGS. 5 and 6 and, therefore, may be best understood with reference thereto, where like numerals represent like element not described again. For the sake of illustration and explanation, FIG. 7 illustrates the core 405, and the coil antennas 404 and 406 as being planar. However, it will be understood that the core 405 and the coil antennas 404 and 406 are curved.

Referring to FIGS. 7 and 8, the antenna assembly 702 may also include the coil antennas 404 and 406 of the antenna assembly 502 both arranged on substantially the same diameter, similar to the antenna assembly 502. However, in the antenna assembly 702, the upper coil antenna, for instance, the coil antenna 406 may be "ramped up" or otherwise displaced from the outer surface 401 of the core 405 in a radially outward direction where the coil antennas 404 and 406 intersect each other. Thus, the coil antenna 404 may contact the outer surface 401 of the core 405 in its entirely, while the coil antenna 406 is separated from the outer surface 401 at least partially. As in the antenna assembly 502, interposer 506 may be arranged between the coil antennas 404 and 406 where the coil antennas 404 and 406 intersect to separate the coil antennas 404 and 406. The interposer 506 may be configured to resist the downhole conditions (e.g., pressure, temperature, vibrations, and the like) such that the coil antennas 404 and 406 do not contact each other. Thus, the coil antennas 404 and 406 of the antenna assembly 702 are also substantially on the same diameter, except for the location where the coil antennas 406 and 406 intersect. As illustrated in FIG. 7, grooves or channels 411 may be defined in the outer surface 401 of the core 405 to receive and seat the coil antenna 404. Similarly, grooves or channels 413 may be defined in the outer surface 401 of the core 405, except at the location where the coil antennas 404 and 406 intersect, to receive and seat the coil antenna 406. However, in other embodiments, the outer surface 401 of the core 405 may be smooth or even, and the coil antennas 404 and 406 may be arranged on the outer surface 401. The loop area difference of the coil antennas 404 and 406 may be less than about 25%. Thus, the thickness (e.g., radial extent) of the interposer 506 may be such that the loop area difference is maintained below about 25%.

As discussed above, the antenna assemblies 402, 502, and 702 include matched coil antennas 404 and 406. However, certain applications may use non-matched coil antennas. In such instances, the antenna assemblies may include co-located coil antennas having loop area differences greater than or equal to 25%, differences in the number of turns of the coils and/or the winding angles. The structure and configuration of antenna assemblies including non-matched coil antennas may be similar to the antenna assemblies 402, 502, and/or 702, and, therefore, may be best understood with reference thereto. An explanation thereof is therefore omitted for the sake of brevity.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the disclosure. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An antenna assembly, comprising:
   a tool mandrel comprising:
   a core positioned about a circumference of the tool mandrel; and
   an outer surface of the core;
   a first coil antenna comprising a first plurality of windings wrapped on the outer surface of the core,
   wherein the first coil antenna is arranged in a first orientation, and
   wherein the first plurality of windings wrap about the tool mandrel at a first winding angle defined with respect to a tool axis of the tool mandrel;
   a second coil antenna comprising a second plurality of windings wrapped on the outer surface of the core,
   wherein the second coil antenna is arranged in a second orientation opposite the first orientation,
   wherein the second plurality of windings wrap about the tool mandrel at a second winding angle defined with respect to the tool axis of the tool mandrel; and
   an interposer disposed to radially displace the first plurality of windings from the second plurality of windings at a location where the first plurality of windings overlaps with the second plurality of windings.

2. The antenna assembly of claim 1, wherein the core comprises a thermoplastic selected from the group consisting of polyphenylene sulfide (PPS), polyetherketoneketone (PEKK), polyetheretherketone (PEEK), polyetherketone (PEK), polytetrafluorethylene (PTFE), and polysulphone (PSU).

3. The antenna assembly of claim 1, wherein the core defines a concave portion on the outer surface, and wherein the first plurality of windings are arranged in the concave portion.

4. The antenna assembly of claim 3, wherein the concave portion is formed on the core at the location where the first coil antenna overlaps with the second coil antenna, and wherein the interposer is disposed in the concave portion between the first plurality of windings and the second plurality of windings.

5. The antenna assembly of claim 4, wherein the interposer is configured to limit contact between the first coil antenna and the second coil antenna.

6. The antenna assembly of claim 4, wherein the interposer comprises fiberglass, polymer, polymer alloy, or a copolymer.

7. The antenna assembly of claim 1, further comprising:
a second interposer disposed between the first plurality of windings and the second plurality of windings at a second location where the first coil antenna overlaps with the second coil antenna.

8. The antenna assembly of claim 7, wherein the interposer is configured to limit contact between the first coil antenna and the second coil antenna.

9. The antenna assembly of claim 1, wherein the first coil antenna and the second coil antenna are elliptical.

10. The antenna assembly of claim 1, wherein the first winding angle is same as the second winding angle.

11. The antenna assembly of claim 1, wherein the first coil antenna and the second coil antenna are concentric.

12. The antenna assembly of claim 1, wherein the first coil antenna and the second coil antenna are eccentric.

13. The antenna assembly of claim 1 wherein the first winding angle and the second winding angle are between 0° and 90°.

14. An antenna assembly, comprising:
a tool mandrel comprising:
a core positioned about a circumference of the tool mandrel; and
an outer surface of the core;
a first coil antenna comprising a first plurality of windings wrapped on the outer surface of the core
wherein the first coil antenna is arranged in a first orientation, and
wherein the first plurality of windings wrap about the tool mandrel at a first winding angle defined with respect to a tool axis of the tool mandrel; and
a second coil antenna comprising a second plurality of windings wrapped on the outer surface of the core,
wherein the second coil antenna is arranged in a second orientation opposite the first orientation,
wherein the second plurality of windings wrap about the tool mandrel at a second winding angle defined with respect to the tool axis of the tool mandrel,
wherein the first coil antenna and the second coil antenna overlap each other, and
wherein the first coil antenna and the second coil antenna are separated from each other by an interposer where the first coil antenna overlaps with the second coil antenna.

15. The antenna assembly of claim 14, wherein the core defines a concave portion on the outer surface thereof where the first coil antenna overlaps with the second coil antenna, and the first plurality of windings are arranged in the concave portion.

16. The antenna assembly of claim 15, wherein the interposer is arranged in the concave portion between the first plurality of windings and the second plurality of windings to separate the first plurality of windings from the second plurality of windings, and wherein the interposer is configured to limit contact between the first coil antenna and the second coil antenna.

17. The antenna assembly of claim 16, wherein the interposer comprises fiberglass, polymer, polymer alloy, or a copolymer.

18. The antenna assembly of claim 14, wherein:
the second plurality of windings are displaced from the first plurality of windings in a radially outward direction by the interposer,
the interposer is disposed between the first coil antenna and the second coil antenna,
the interposer separates the first coil antenna from the second coil antenna at a location where the first coil antenna overlaps with the second coil antenna, and
the interposer is configured to limit contact between the first coil antenna and the second coil antenna.

19. The antenna assembly of claim 14 wherein the first winding angle and the second winding angle are between 0° and 90°.

20. A method, comprising:
introducing a wellbore logging tool into a wellbore, the wellbore logging tool comprising the antenna assembly of claim 1; and
obtaining measurements of a surrounding subterranean formation with the wellbore logging tool.

21. The method of claim 20, wherein the tool mandrel is operatively coupled to a drill string and introducing the wellbore logging tool into the wellbore further comprises:
extending the wellbore logging tool into the wellbore on the drill string; and
drilling a portion of the wellbore with a drill bit secured to a distal end of the drill string.

22. The method of claim 20, wherein introducing the wellbore logging tool into the wellbore further comprises extending the wellbore logging tool into the wellbore on wireline as part of a wireline instrument sonde.

23. The method of claim 20, wherein the second plurality of windings are wrapped about a second core that overlaps the core and is positioned about the circumference of the tool mandrel.

24. The method of claim 20, wherein the first plurality of windings and the second plurality of windings are radially separated from each other where the first coil antenna overlaps with the second coil antenna.

25. The method of claim 24, wherein the outer surface of the core defines a concave portion where the first coil antenna overlaps with the second coil antenna, the first plurality of windings are arranged in the concave portion, and the interposer is positioned in the concave portion and between the first coil antenna and the second coil antenna.

26. The method of claim 24, wherein the second plurality of windings are displaced in a radially outward direction from the first plurality of windings via the interposer positioned between the first coil antenna and the second coil antenna at the location where the first coil antenna overlaps with the second coil antenna.

27. A method, comprising:
introducing a wellbore logging tool into a wellbore, the wellbore logging tool comprising the antenna assembly of claim 14; and
obtaining measurements of a surrounding subterranean formation with the wellbore logging tool.

28. The method of claim 27, wherein the tool mandrel is operatively coupled to a drill string and introducing the wellbore logging tool into the wellbore further comprises:
extending the wellbore logging tool into the wellbore on the drill string; and
drilling a portion of the wellbore with a drill bit secured to a distal end of the drill string.

* * * * *